United States Patent [19]

Boehnlein

[11] 4,107,848

[45] Aug. 22, 1978

[54] PROFILER

[75] Inventor: James E. Boehnlein, Mentor, Ohio

[73] Assignee: PMC Industries, Inc., Wickliffe, Ohio

[21] Appl. No.: 766,009

[22] Filed: Feb. 7, 1977

[51] Int. Cl.² .............................................. G01B 7/28
[52] U.S. Cl. .................................. 33/174 P; 33/174 L
[58] Field of Search ............ 33/174 P, 174 R, 143 R, 33/143 L, 174 L

[56] References Cited

U.S. PATENT DOCUMENTS

| | | | |
|---|---|---|---|
| 2,397,108 | 3/1946 | Hanna et al. | 33/174 P |
| 2,703,456 | 3/1955 | Smith | 33/174 P |
| 3,319,340 | 5/1967 | Graham | 33/174 P |
| 3,319,341 | 5/1967 | Graham | 33/174 P |

Primary Examiner—Richard E. Aegerter
Assistant Examiner—Willis Little
Attorney, Agent, or Firm—John Harrow Leonard

[57] ABSTRACT

A profiler employing an arm which rocks about a fixed axis and carries a stylus for following a profile to be indicated and recorded. During rocking of the arm from, and return to, a normal starting position, the arm is extended by a cam, and spring returned under the control of the cam, so that the surface engaging edge of the stylus follows a lineal path tangent to the arcuate path which the edge would follow were the arm of constant length. The point of tangency of the lineal path is at the position of the surface engaging edge in the normal starting position of the arm. This adapts the profiler for more accurate indications of profiles, especially in profiles in which departures from the mean are large. A second like arm and stylus are provided and arranged so that the stylus edge follows a lineal path coincident with the same tangent. As a result profiles of opposite faces of an article can be traced by the styli, respectively, simultaneously, at points aligned with each other lengthwise of the tangent.

8 Claims, 9 Drawing Figures

PROFILER

BACKGROUND OF THE INVENTION

(1) Field of Invention

Profilers for indicating and recording the profiles of surfaces of articles.

(2) Description of Prior Art

Heretofore, profilers of the rocking arm type have been provided for tracing surface profiles of articles and for indicating and recording the profiles traced. An example of such a profiler of the single rocking arm type is disclosed in United States Letters Pat. Nos. 3,319,340 and 3,319,341, both issued May 16, 1967, and each entitled "Profile Indicator and Recorder."

A multi-arm type of profiler, by which opposite faces of an article can be traced concurrently is disclosed in U.S. Pat. No. 3,370,355, issued Feb. 27, 1968, and entitled "Profiler."

With profilers of the above patents, for a given size, a high degree of accuracy is obtained, but only if the divergence of the profile from a given mean or median plane is within relatively moderate limits. This is because the rocking arm of each of these profiles is of constant length and hence the article engaging edge of the stylus follows an arcuate path of constant radius about the rocking axis. Accordingly, assuming a tangent to the arcuate path, with the point of tangency at the tracing edge of the stylus in the starting position of the arm, the arcuate path of the stylus edge recedes from the lineal tangential path at a progressively increasing rate the farther the stylus edge travels from the point of tangency or starting position. This affects the degree of accuracy that can be obtained so that, for a given required degree, a given size of profiler is limited to use only for articles of which the profile variations from a given mean or median do not require the stylus to swing through too large an arc.

SUMMARY

In accordance with the present invention, a greater range of variation from the mean can be indicated and recorded, without appreciable loss of accuracy, by causing the tracing edge of the stylus to follow a path tangential to the arcuate path such as followed in the above prior profilers. This is effected by increasing progressively the length of the radius from the pivotal axis to the tracing edge of the stylus as the tracing edge swings away from its starting position, and shortening the radius as the tracing edge returns toward starting position. The change in radius is accomplished by making the arm extensible and retractable relative to its supporting rocker, increasing the length of the portion of the rocking arm, between the stylus and the rocking axis, progressively in relation to the angular departure of the arm from its starting position, and by progressively reducing the length of that portion of the arm in relation to the angular approach of the arm toward its starting position.

Various other objects and advantages will become apparent from the following description wherein reference is made to the drawings

Figure 1:
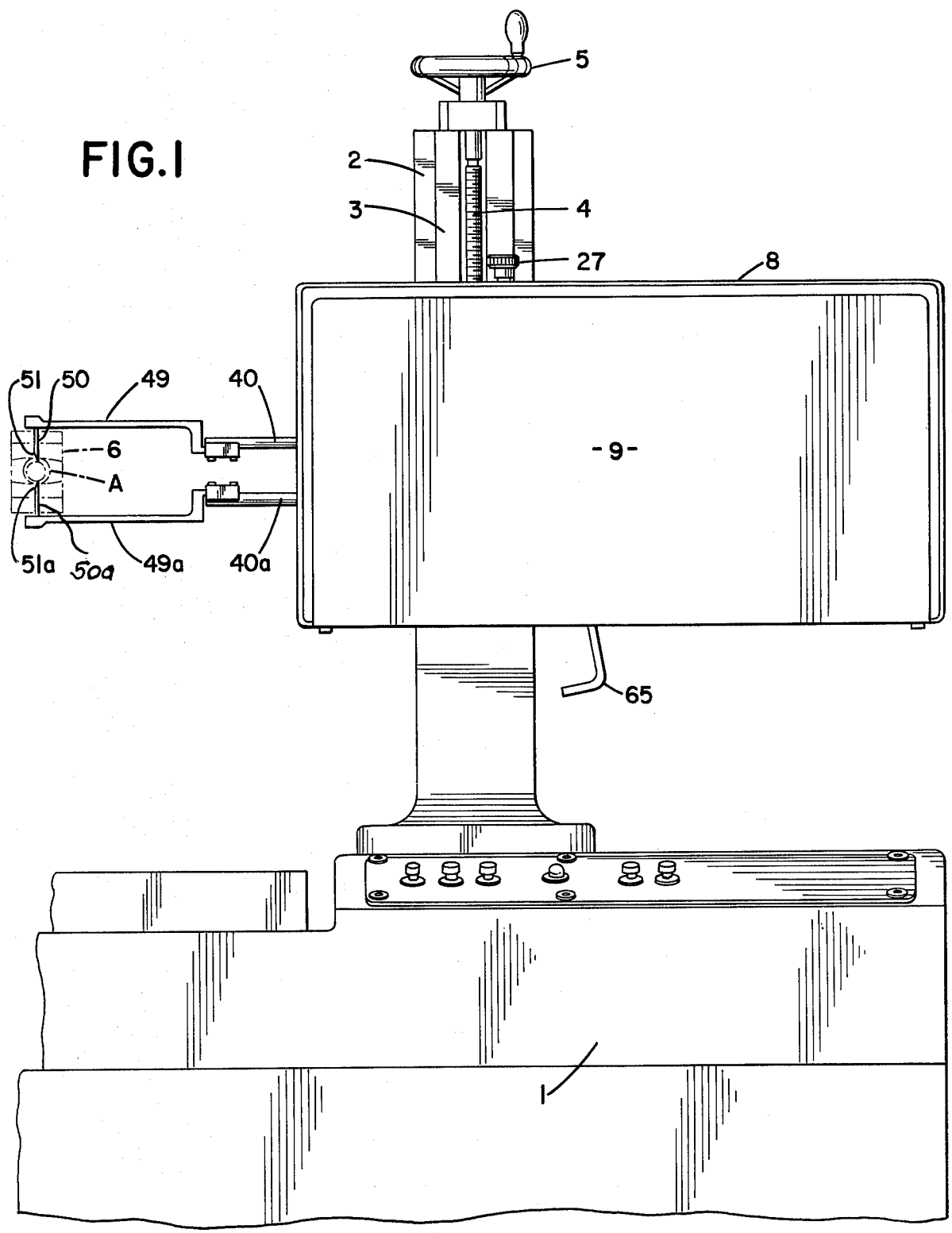
FIG. 1 is a front elevation of the profiler embodying the principles of the present invention, an article holder, and an electronic amplifier and recording indicator used in connection with the profiler being shown diagrammatically.
Figure 2:
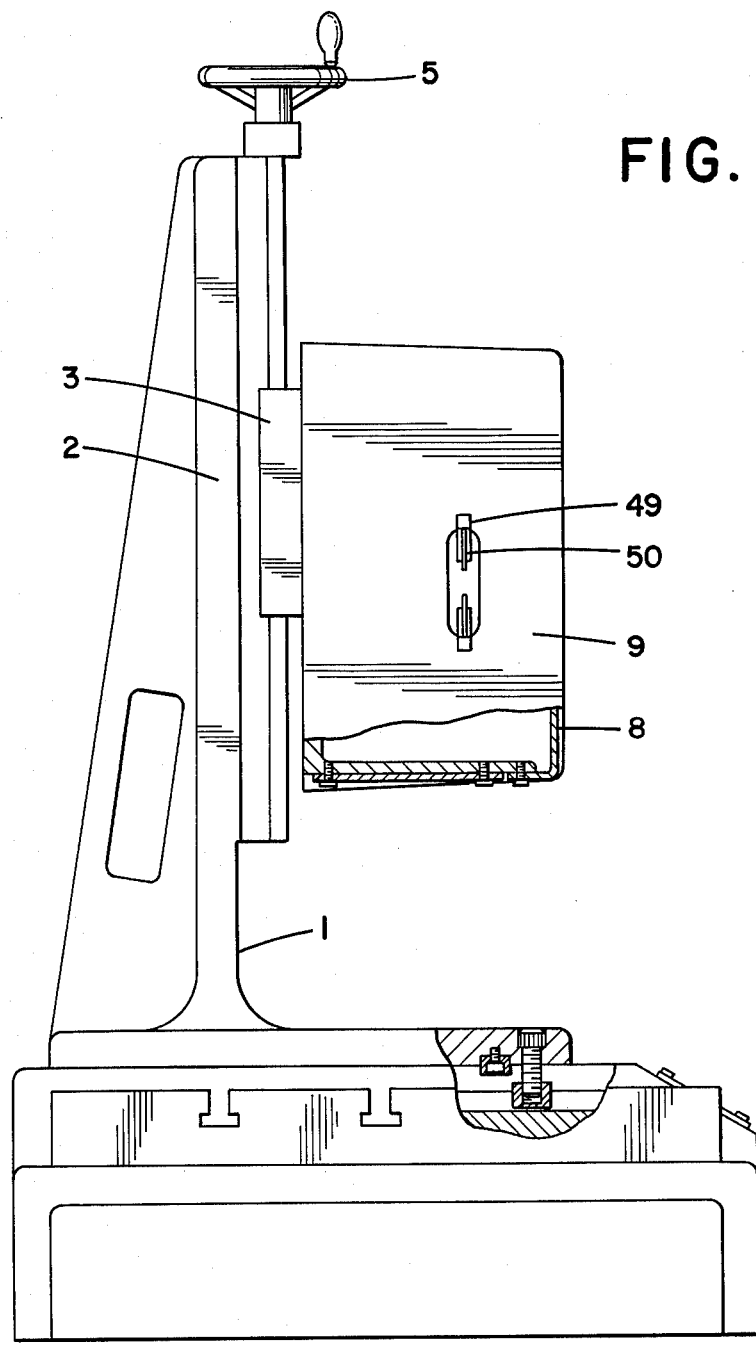
FIG. 2 is a left end elevation of the profiler illustrated in FIG. 1.

Referring first to FIG. 1, the profiler comprises a base 1 on which is mounted a pedestal 2 carrying a vertical slide 3 which may be driven to adjusted heights by means of a conventional worm screw 4 driven by a hand wheel 5. The base may support a suitable adjustable holder 6 by which is supported an article A of which the profile of one or both opposite surfaces is to be taken.

Carried on the vertical slide 3 is an outer supporting frame 8 enclosed by removable cover 9. The frame 8 carries a rigid upright support or plate 10 on the front of which a horizontal granite bar 11 is mounted by its ends. The bar 11 is arranged to support and guide the profiling mechanism as the mechanism moves along the bar for causing the profiling stylus to traverse the article surface of which the profile is being taken. For this purpose a traversing carriage 12 is slidably mounted on the bar 11, and is maintained in proper sliding relation to the bar by means of rocking slide pads 13, such as used on the carriage in the gauge disclosed in U.S. Pat. No. 3,360,263, issued Aug. 12, 1969. Such a slide mounting assures that the carriage will move along a true lineal horizontal path while maintained in an accurate position relative thereto without undue wear on the bar 11.

The carriage 12 is provided with a lead nut 14 which is in driven engagement with a feed screw 15. The nut 14 is adjustable so that slack between the thread of the nut 14 and thread of the drive screw 15 is eliminated. The screw 15 is driven through universal joints 16 and 17 and suitable reduction gear train 18 which, in turn, is driven by a motor 19 by way of a belt 20.

Figure 3:
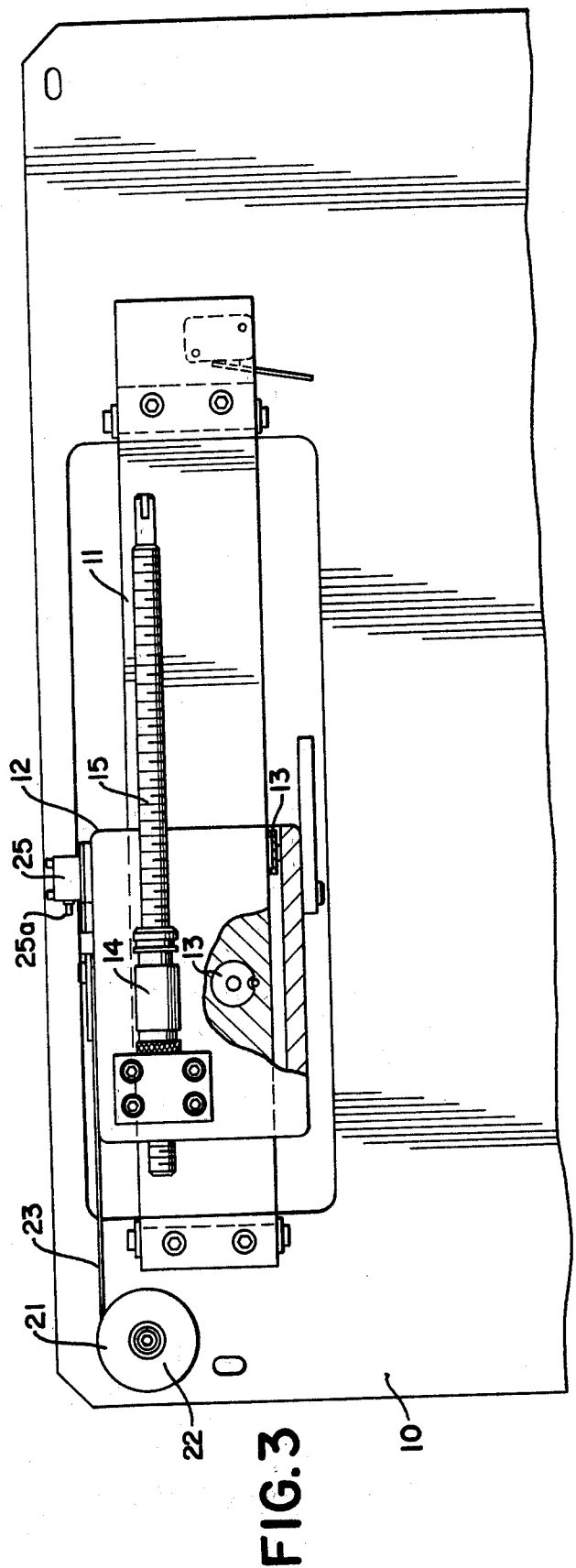
FIG. 3 is a fragmentary front elevation of a portion of the profiler illustrated in FIGS. 1 and 2, with the cover removed, and showing the traveling carriage which supports the profiling mechanism and the driving mechanism for the carriage.
Figure 4:
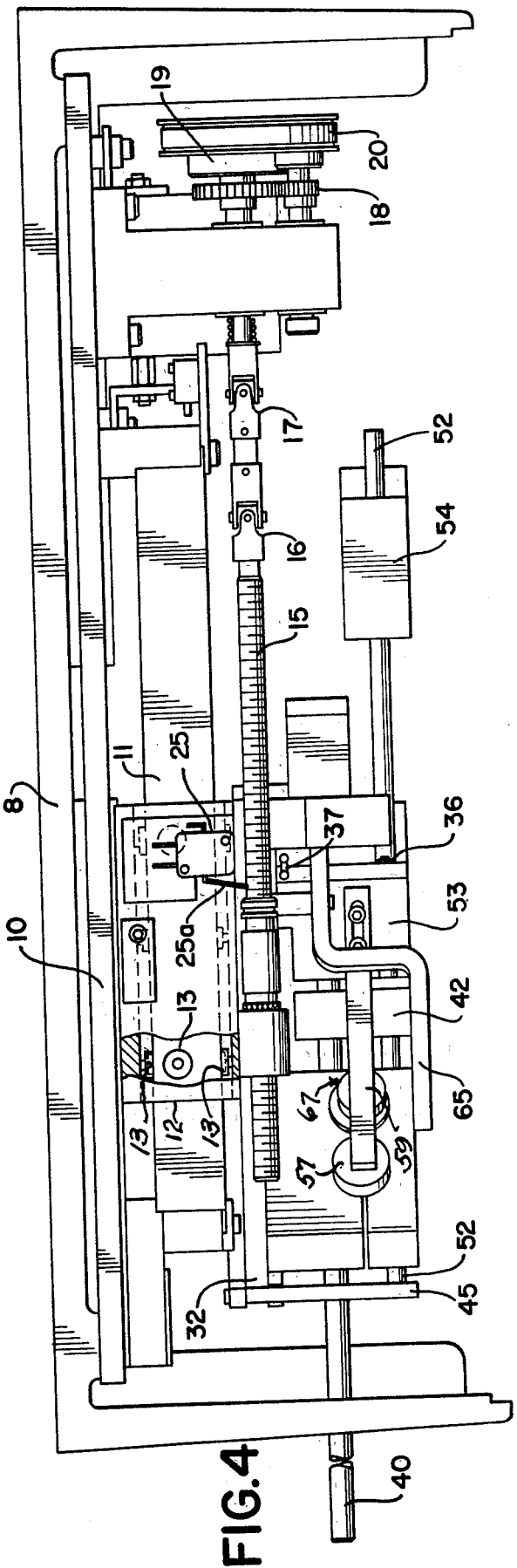
FIG. 4 is a fragmentary top plan view, partly in section, of the profiler showing the carriage and profile tracing mechanism carried thereby.

Supported on the plate 10 is a compensator 21 which prevents vibration or errors in carriage travel that might otherwise be introduced by the diferential drive. The compensator comprises a spring biased reel 22 connected by a tension band 23 to the carriage 12 so as to bias the carriage 12, to the left in FIG. 3.

Mounted on the carriage 12 is a micro-switch 25 having an operator 25a which, when depressed, stops the travel of the carriage 12 in the driving or advancing direction. In order to stop the carriage in preselected adjusted positions, an adjustable stop 26 is mounted on the frame 8 and may be adjusted therealong, lengthwise of the carriage path, and clamped in the adjusted positions by means of a hand nut 27. The adjustable stop has an adjustable abutment 28 which is positioned to engage and operate the operator 25a of the micro-switch 25. A travel indicating gauge 29 is mounted on the frame 8 for cooperation with an indicating finger 30 on the stop for convenience in indicating the position of the carriage.

Referring next to the specific elements of the profiling mechanism, this mechanism is shown, for illustration, in a profiler designed to indicate the profiles on opposite sides of an article concurrently at points directly aligned vertically. For this purpose, upper and lower profiling devices, respectively, are provided. These devices are mounted on a carriage plate 12a which is secured fixedly to the carriage 12 for travel therewith along the bar 11. Since each of these devices is essentially the same as the other in form and function, the upper device 31 is referred to specifically, and the corresponding parts of the lower device are indicated by numerals corresponding to those of the upper device but with the suffix a added.

Figure 8:
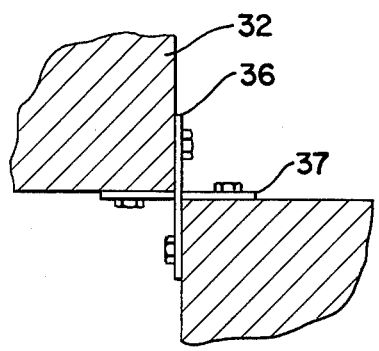
FIG. 8 is an enlarged fragmentary front elevation, partly in section, of part of the profiler tracing mechanism, showing the pivotal mounting of the rocker thereof.
Figure 9:
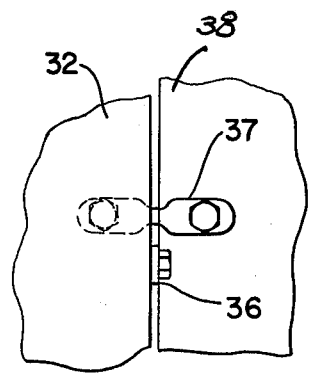
FIG. 9 is a fragmentary top plan view of the structure illustrated in FIG. 8.

The upper device shown for illustration comprises a rocker 32 in which is a sleeve bearing 33 provided with internal ball bearings 34. The rocker 32 is mounted by one end on pivot means for rocking about a horizontal axis. As best shown in FIGS. 8 and 9, the pivot means comprises a pair of vertical single leaf springs 36 and a pair of horizontal single leaf springs 37. These leaf springs are light and flexible and each is connected at one of its ends to the rocker 32 and at the other of its ends to a supporting block 38 secured to the carriage plate 12a. Thus the springs 36 and 37 define a pivot means having a fixed pivotal axis 39. Accordingly, the rocker 32 can rock about a horizontal axis extending transversely of, and offset from, the longitudinal axis of its sleeve bearing 33.

Figure 5:
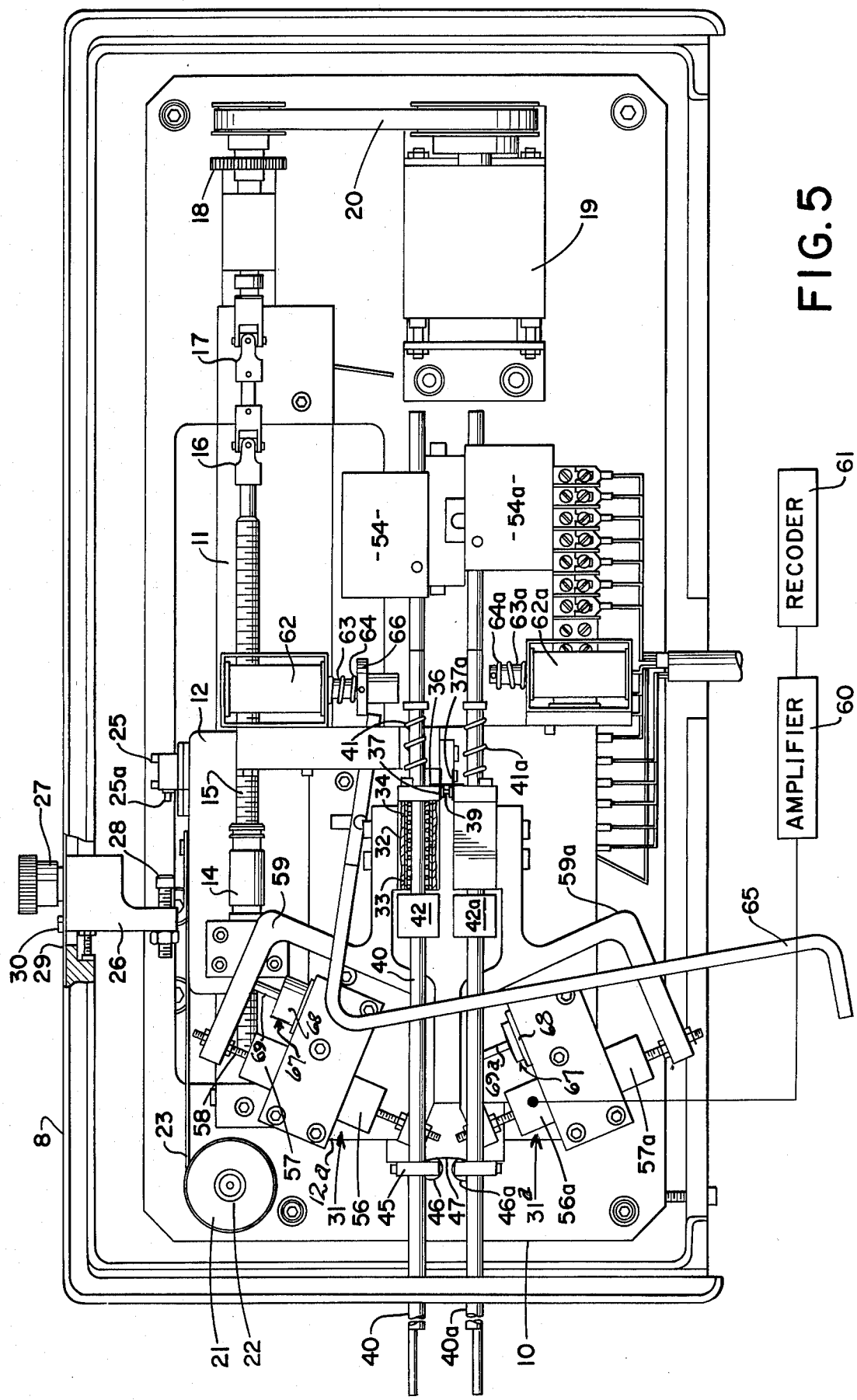
FIG. 5 is a fragmentary front elevation of the profiler, partly in section, and showing the profile tracing mechanism in greater detail.
Figure 6:
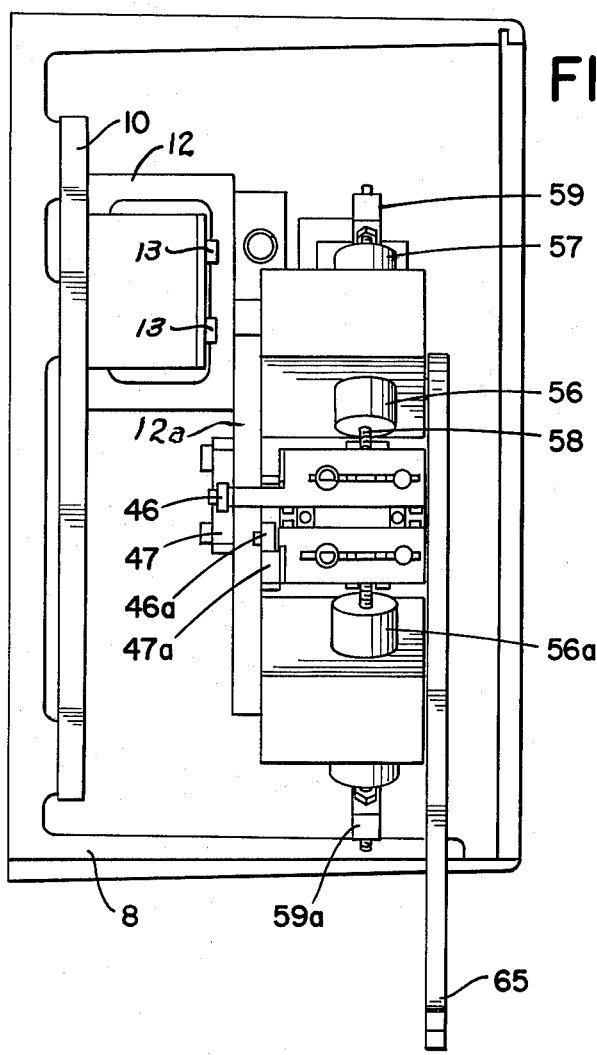
FIG. 6 is a fragmentary left end elevation of the structure illustrated in FIG. 5.

Mounted for anti-friction movement axially in the sleeve bearing 33 is a stylus carrying arm 40 which, adjacent the rear end of the rocker 32, carries a suitable retracting spring 41 which biases the arm 40 to the right in FIG. 5 to a retracted position. A suitable stop bracket 42 is mounted in fixed position on the arm 40 for stopping the movement of the arm 40 to the right by biasing spring 41 at a predetermined fully retracted location while permitting the arm 40 to be moved to the left against the resistance of the spring 41 to extended positions.

A bracket 45 is securely fastened to the arm 40 in spaced relation forwardly from, or to the left of, the stop bracket 42 and carries a cam roller 46. A complementary cam 47 is mounted on the plate 10 and is concave toward the outer end of the arm 40, and is operative as the arm 40 swings away from starting position, to move the arm 40 to extended position relative to the rocker 32. The cam 47 also controls the return of the arm 40 by the spring 41 to retracted position as the arms swing toward starting position.

The arm 40 has, at its outer end, a rigid extension 49, which, at its outer end, carries a stylus 50 of which the lower or tracing edge 51 is an article engaging and profile tracing edge for engaging the surface to be profiled.

Connected at one end to the bracket 45 is a counterbalance rod 52 which extends rearwardly and through the stop bracket 42, and through a suitably anti-friction sleeve bearing 53, like and parallel to the sleeve bearing 33, which is within and forms part of the rocker 32. The rod 52 extends entirely through the bearing 53 and therebeyond and at its rearmost end carries an adjustable counterweight 54. The counterweight is so adjusted that normally the rocker 32 and arm 40 are overbalanced so that the forward end of the arm, and the stylus 50, are urged downwardly by gravity so as to apply the tracing edge 51 of the stylus under light pressure to the article surface being profiled.

The lower arm 40a is similarly counterbalanced by a counterweight 54a, but with the difference that the counterbalancing is such that, by gravity, it urges the arm 40a upwardly so that the tracing edge of its stylus engages the opposite face of the article, concurrently, with and on the same vertical line as the upper stylus edge, and under light pressure.

A critical feature of the invention is the relation of the cam 47 and arm 40 as a result of which, during rocking of the arm, they maintain the tracing edge 51 of the stylus in a lineal path, instead of an arcuate path.

Figure 7:
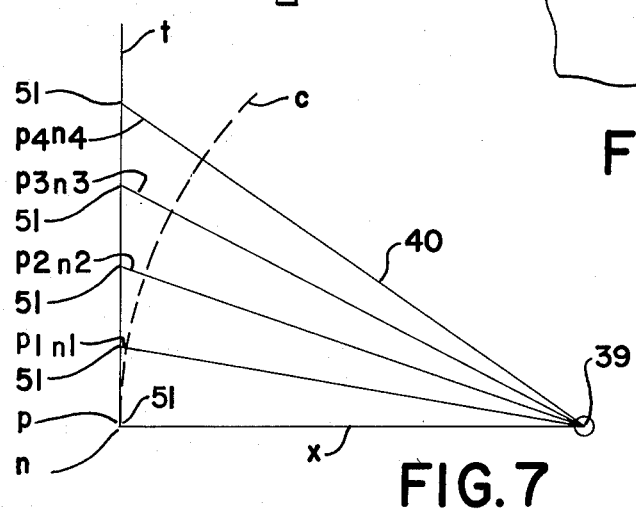
FIG. 7 is a diagrammatic illustration showing, in exaggerated form, the relation between the tangential lineal path followed by the surface engaging edge of a stylus of the profiler of the present invention and the arcuate path followed by the stylus edge of the prior profilers.

As indicated in FIG. 7, assume that the arm 40 is in a starting position in which the tracing edge 51 of the stylus 50 lies in a horizontal plane $x$ extending through the axis 39 of the rocker 32. It is apparent that if the distance of the edge 51 from the pivot 39 remains constant, as occurs if the arm 40 remains in a fully retracted position in which the stop bracket 42 engages the forward end of the rocker 32, the tracing edge 51 of the stylus 50 will travel through a circular arc $c$, indicated by a dotted line, as the arm 40 is swung upwardly about the rocker axis 39, instead of following a lineal path to tangent to the arc $c$. The rate of departure from the tangent $t$ progressively increases as the arm recedes upwardly from starting position. Consequently, if the rise and fall of the profile from a given median line is beyond certain narrow limits, this departure introduces an unacceptable error in the reading. Thus, as indicated in FIG. 7, the tracing edge 51 starts at a position $p$, in a horizontal plane through the axis 39. At this point the departure from the tangent $t$ is zero, as indicated at $n_o$. As the edge 51 rises, it passes successively through positions such as indicated at $p$, through $p_4$, wherein the departure $n$, through $n_4$, increases at a disproportionate rate.

Optimally, the edge 51 of the stylus 50 should rise and fall along the tangent $t$ having its point of tangency to the curve $c$ in the starting position of the edge 51.

The cam 47 is shaped so that, as the arm 40 rises from the starting position, at which the tracing edge 51 is at position $p$, in a horizontal plane through the axis 39, it causes the arm to extend progressively, thereby moving the stylus 50 progressively further from the axis 39 and causing the edge 51 to follow the vertical tangent $t$ to the arc $c$. This eliminates the error due to departure from the tangent that would occur were the arm 40 of fixed length, and thereby increases the range of profile departure from the median plane that can be traced with an instrument of a given size, as compared to a like size instrument with a constant length arm. The same is true as to the lower arm 40a and its cam 47a, so that the edge 51a of its stylus 50a also travels along a lineal path coincident with the same tangent $t$ to the curve $c$.

In order to obtain a signal corresponding to the movement of the arm or rocker, as the stylus edge follows a profile, an electronic signal creating device is provided. Many types of devices for this purpose, which reflect the movements of an element as electrical signals are available on the market, but the one shown herein, for illustration, is a linear variable differential transducer 56. The transducer comprises a stationary element 57 fastened in fixed position to the carriage supported plate 12a and a movable piston element 58 connected to a suitable bracket 59 which, in turn, is secured to the rocker 32 for rocking therewith. The transducer 56 delivers a signal, corresponding to the rocked position of its associated arm which, as indicated diagrammatically in FIG. 5, is fed to an amplifier 60 of a conventional recording indicator 61.

In order to swing the arm 40 upwardly and the arm 40a downwardly, concurrently, so as to permit easy introduction of the article between the styli edges 51 and 51a, solenoids are provided. For example, a solenoid 62 is mounted on the plate 12a and has a core 63 biased downwardly by a spring 64. When the solenoid 62 is deenergized, the spring biased core applies downward force to the arm 40 at the right of the pivot 39, thus raising the stylus 50 which is overbalanced to swing downwardly by gravity. A like solenoid 62a for the lower arm 40a, when deenergized concurrently, applies spring force upwardly on the arm 40a to the right of the pivot arm 39a, thus lowering the stylus 50a on the arm 40a which is overbalanced to swing upwardly by gravity.

Suitable electric connections are provided so that when it is desired to start the motor to drive the profiler to the left for tracing a profile, the solenoids 62 and 62a are energized, whereupon the styli 50 and 50a are released by their solenoids and move by gravity toward each other and engage, with light pressure, the opposite faces of the article, at points, respectively, which are in direct vertical alignment with each other.

However, it sometimes happens that the operator desires to move the arm 40 independently of the solenoid 62, and for this purpose a rocking hand lever 65 is provided engaging a collar 66 on the core 63 for lifting the core 63, against the force of the spring 64, clear of the arm 40.

Here it is to be noted that all of the profile tracing mechanism is mounted on the single plate 12a, mounted on the carriage 12, as shown in FIG. 5, so that the mechanism can be installed and removed as a unit.

In operation, the article A is mounted on its support 6 in the proper starting position with the arms 40 and 40a swung outwardly from each other to maximum position. The solenoids 62 and 62a are then deenergized whereupon the arms swing toward each other by gravity, applying the edges 51 and 51a of the styli 50 and 50a to the article at locations on coincident tangents t to the curve c. The motor 19 is started and drives the carriage 12 to the left. The tracing edges 51 and 51a, moving always on coincident tangents t, follow the contour of the respective faces of the article as the leftward movement of the carriage 12 continues and until such time as the stop 28 engages the operator 25a of the microswitch 25 and stops the travel of the carriage 12.

During this operation, an indicator on the recorder 61 and a pen thereof records on a traveling recording paper, an enlarged profile of the surfaces of the article traversed by the styli.

In most instances, the amount of extension of the arm 40 endwise in order to cause it to follow the tangent t is a few thousandths of an inch. In normal starting position, the spring 41 holds the stop 42 against the left end of the rocker 32. Obviously, the faces of the cams 47 and 47a are selected in accordance with the distance between the associated rocking axis and the stylus edge in the normal starting position, and so different cams are selected depending on differences in sizes of machines in which incorporated.

Suitable dampers 67 and 67a, of the type comprising a fluid filled cup 68 and dip rod 69 may be provided, one damper 67 for the device 31 and one damper 67a for the devices 31a.

Having thus described my invention, I claim:

1. In a profiler, a profile tracing device comprising:
a support;
pivot means on the support;
a rocker carried by the pivot means for rocking about the axis thereof;
a stylus holding arm having a stylus holding portion adapted to hold a stylus which has a tracing edge for tracing the profile of the surfaces of an article;
means connecting the arm to the rocker, at a location spaced from said portion, for rocking of the arm with the rocker about said axis to and from a predetermined normal arm position, and for concurrent movement of at least the stylus holding portion of said arm, endwise of the arm, relative to the rocker, away from and toward said axis, to extended and retracted positions, respectively, during rocking of the rocker;
driving means, including a cam member and complementary follower member which are connected one member to the stylus holding portion and the other member to the support, drivingly interconnecting the support and the stylus holding portion of the arm and rendered operative, by rocking the arm away from said normal arm position, to extend the stylus holding portion of the arm progressively as the arm rocks progressively farther from normal arm position, and rendered operative by rocking the arm toward said normal arm position to retract the stylus holding portion of the arm progressively as the arm rocks progressively nearer to said normal arm positions, said cam member having a profile surface engaged by the follower member, and shaped so that the tracing edge of a stylus carried by said arm portion is constrained by the members to follow, in each of said directions of rocking of the arm, a substantially lineal path tangent to the arcuate path which would be described by said edge were said edge swung about said axis at a constant radius equal to the distance from said edge to said axis in the normal starting position of the arm, and with the point of tangency of said path substantially at the location of said edge in said normal starting position of the arm.

2. The structure according to claim 1 wherein said one of said members connected to said stylus holding portion of the arm is connected in fixed position relative thereto endwise of the arm; and the other of said members, connected to the support, is connected in fixed position relative to the support.

3. The structure according to claim 1 wherein said members are arranged to drive the stylus holding portion of the arm in the extending direction endwise of the arm, to extended position.

4. In a profiler according to claim 1, said rocker comprises an elongated bearing mounted on said pivot means;
said portion of the arm is antifrictionally supported by the bearing in fixed position transversely of the arm relative to the bearing, for movement endwise of the arm and bearing in a direction normal to the axis of said pivot means, away from and toward the pivotal axis to extended and retracted positions, respectively.

5. A profiler according to claim 1 wherein said members drive the stylus holding portion in one of said directions endwise of the arm, and the driving means further includes return means to return said portion endwise of the arm in the opposite one of said directions.

6. A profiler according to claim 5 wherein said return means includes a return spring.

7. A profiler according to claim 5 wherein the follower member is a roller in rolling engagement with said profile surface of the cam member.

8. A profiler according to claim 6 wherein the members drive the stylus holding portion in the extending direction and the return spring biases the stylus holding portion in the retracting direction and to retracted position.

* * * * *

UNITED STATES PATENT OFFICE
CERTIFICATE OF CORRECTION

Patent No. 4,107,848            Dated August 22, 1978

Inventor(s) James E. Boehnlein

It is certified that error appears in the above-identified patent and that said Letters Patent are hereby corrected as shown below:

Column 3, line 55, the numeral "10" has been changed to --12a--.

Signed and Sealed this

Tenth Day of November 1981

[SEAL]

*Attest:*

*Attesting Officer*

GERALD J. MOSSINGHOFF

*Commissioner of Patents and Trademarks*